United States Patent [19]

Hojo et al.

[11] Patent Number: 4,669,323

[45] Date of Patent: Jun. 2, 1987

[54] ERECTOR

[75] Inventors: Takeshi Hojo; Shinichi Kawada, both of Kuroiso, Japan

[73] Assignee: Kabushikikaisha Tokyo Keiki, Tokyo, Japan

[21] Appl. No.: 696,902

[22] Filed: Jan. 31, 1985

[30] Foreign Application Priority Data

Feb. 6, 1984 [JP] Japan .................................. 59-19655
Feb. 6, 1984 [JP] Japan .................................. 59-19656
Feb. 6, 1984 [JP] Japan .................................. 59-19658

[51] Int. Cl.⁴ ...................... G01C 19/30; G01C 19/52
[52] U.S. Cl. ........................................ 74/5.44; 74/5.8
[58] Field of Search ................ 74/5.44, 5.45, 5.8, 74/5.42, 5.41, 5.5, 5.47

[56] References Cited

U.S. PATENT DOCUMENTS

| 1,311,768 | 7/1919 | Gray et al. | 74/5.41 X |
| 2,697,354 | 12/1954 | Johnson | 74/5.44 |
| 4,294,128 | 10/1981 | Giesenberg | 74/5.44 |
| 4,354,394 | 10/1982 | Giesenberg . | |

FOREIGN PATENT DOCUMENTS

| 325521 | 3/1935 | Italy | 74/5.44 |
| 126395 | 5/1919 | United Kingdom | 74/5.45 |
| 603158 | 6/1948 | United Kingdom | 74/5.44 |

Primary Examiner—Rodney H. Bonck

[57] ABSTRACT

An erector for holding a spin axis of a gyro rotor in the vertical direction used in a gyroscopic horizon or gyro vertical which comprises a gyro casing incorporating therein a gyro rotor rotating at high speed, a spin axis of the gyro rotor being held substantially in the vertical direction, first supporting member for rotatably supporting the gryo casing around a first horizontal axis which is perpendicular to the spin axis and second supporting member for rotatably supporting the first supporting member around a second horizontal axis which is perpendicular to both the spin axis and the first horizontal axis is disclosed, which includes a base plate, a motor mounted on the base plate, a rotation receptacle container having an annular shape cavity and rotated at low speed by the motor, and liquid charged into the annular shape cavity of the rotation receptacle container, the base plate being mounted on the gyro casing such that the rotation axis of the rotation receptacle container and the spin axis of the gyro rotor become parallel to each other.

4 Claims, 15 Drawing Figures

ERECTOR

BACKGROUND OF THE INVENTION

1. Field of the Invention

This invention relates generally to erectors for use with a gyroscopic horizon or gyro vertical which uses a gyro to detect an inclination angle of a navigation vessel or vehicle such as ships and the like and transmit the corresponding signal. More particularly, the present invention relates to an erector by which when the spin axis of a gyro rotor used in the gyroscopic horizon is displaced from the vertical line, in accordance with the displaced amount of the spin axis, an erecting torque is applied so as to make the spin axis coincident with the vertical line.

2. Description of the Prior Art

FIG. 1 is a perspective view illustrating an outlined construction of an example of a prior art gyroscopic horizon to which this invention will be applied.

In FIG. 1, reference numeral 1 generally designates a gyro casing which incorporates therein a gyro rotor 2 the spin axis of which is substantially coincident with the vertical line and the gyro rotor 2 is rotated at high speed. Reference numeral 3 designates an erector which holds the spin axis of the gyro rotor 2 in substantially the vertical state. The gyro casing 1 is provided at its position perpendicular to the spin axis of the gyro rotor 2 with pitch shafts 4 and 4'. Reference numeral 5 designates a gimbal ring which is located in the outer periphery of the position of the gyro casing 1 as shown in the figure. The gimbal ring 5 has pitch axis bearings 6 and 6' with which the pitch shafts 4 and 4' are respectively engaged so that the gyro casing 1 is rotatably supported around the pitch shafts 4 and 4'. The gimbal ring 5 is provided at its position perpendicular to the pitch axis bearings 6 and 6' with roll shafts 7 and 7' and the roll shafts 7 and 7' are respectively engaged with roll axis bearings 9 and 9' provided in two bearing base plates 8 and 8' which are mounted on a base plate 10, whereby to rotatably support the gimbal ring 5 around the roll shafts 7 and 7'.

Reference numeral 11 designates a pitch angle transmitter which transmits to the outside a signal that corresponds to a rotation angle (that is, the pitch angle of the navigation vessel) of the gimbal ring 5 with respect to the gyro casing 1 around the pitch shafts 4 and 4'. Reference numeral 12 designates a roll angle transmitter which transmits to the outside a signal that corresponds to the rotation angle (that is, the roll angle of the navigation vessel) of the gimbal ring 5 with respect to the base plate 10 around the roll shafts 7 and 7'.

FIG. 2 is an enlarged cross-sectional view of an example of the prior art erector 3 shown in FIG. 1. As shown in FIG. 2, in accordance with this prior art example, a disc-shape magnet 3-1 of the erector 3 is engaged with the tip end portion of an extended portion 2-2 which is attached to the upper portion of the shaft 2-1 of the gyro rotor 2. While, the gyro casing 1 is provided on its upper portion with an annular groove portion 1-1, and this gyro casing 1 is attached with a sun gear 3-2 having a boss 3-3 with which the inner ring of a bearing 3-4 is engaged. A rotation portion 3-5 of the erector 3 is pivotably supported by the outer ring of the above bearing 3-4 and has fixed thereto an annular ring 3-6 made of a good electrically conductive metal such as copper and the like in opposing relation to the magnet 3-1. A planetary gear 3-8 which is meshed with the sun gear 3-2 and a ratchet gear 3-9 are each coaxially fixed to a shaft 3-7 which is rotatably supported by the rotation portion 3-5.

FIG. 3 is a top view showing a main part of FIG. 2. As shown in FIG. 3, a ratchet member 3-10 is rotatably supported by the rotation portion 3-5 so as to intermittently engage with the ratchet wheel 3-9 and to thereby form a speed damper, namely, a speed governor mechanism section. As shown in FIG. 3, the rotation portion 3-5 has at its position opposite to the speed governor mechanism section two arms 3-11 and 3-12. The arm 3-11 is provided at its position contacting with a ball 3-15 a patch metal 3-13, while the other arm 3-12 is provided at its position contacting with the ball 3-15 a roller 3-14.

Since the magnet 3-1 is fixed to the extended portion 2-2 of the shaft 2-1 of the gyro rotor 2, the magnet 3-1 is rotated together with the gyro rotor 2 at high speed. While, since a torque caused by an eddy current which is produced by the cooperation of the annular ring 3-6 and the magnet 3-1 is applied to the rotation portion 3-5, this rotation portion 3-5 is rotated in the same direction as that of the gyro rotor 2, to tilt shaft 2-2. The rotation of the rotation portion 3-5 is transmitted through the sun gear 3-2 and the planet gear 3-8 to the ratchet gear 3-9 and the ratchet member 3-10 (the speed governor mechanism section) and applied with a damping torque corresponding to the rotation speed so that the rotation speed of the rotation portion 3-5 is held low and substantially constant.

FIG. 4 is a diagram in which the prior art erector 3 shown in FIGS. 2 and 3 is viewed from the above (the left and right-hand sides thereof are reversed relative to FIG. 3). In this case, the gyro casing 1 is inclined by an angle $\theta$ around X-X' axis in the figure. As shown in FIG. 4, when the ball 3-15 exists in the right-hand side half of Y-Y' axis, the slope is ascended so that the decelerating torque is produced by the weight of the ball 3-15. At this time, since the ball 3-15 is comes in contact with the patch metal 3-13 and given a drag force is produced thereby, the rotation speed of the rotation portion 3-5 becomes lowered.

On the other hand, when the ball 3-15 comes to the left-hand side half of the Y-Y' axis, the slope is descended so that the ball 3-15 is rolled by its weight within a movable range angle $\phi_0$ of the ball 3-15 between the arms 3-11 and 3-12. When the ball 3-15 contacts with the roller 3-14, it is rotated together with the rotation portion 3-5 while in contact with the roller 3-14. In this case, due to the fact that the torque caused by the weight of the ball 3-15 acts so as to accelerate the rotation of the rotation portion 3-5; the ball 3-15 contacts with the roller 3-14 and hence its friction torque is made smaller as compared with that of the case in which the ball 3-15 exists in the right-hand side half of the Y-Y' axis; and that the movable range angle $\phi_0$ is formed between the arms 3-11 and 3-12 and the ball 3-15 itself rotates without being substantial resistance, and the rotation speed of the ball 3-15 becomes higher than that of the case in which the ball 3-15 is located in the right-hand side half of the Y-Y' axis. In other words, since the duration of the period in which the ball 3-15 is located in the right-hand side half of the Y-Y' axis is made to be long by the inclination angle $\theta$ of the spin axis of the gyro rotor 2, and the torque as shown by $\overline{T}$ in FIG. 4 is produced. This torque $\overline{T}$ acts as the precession torque of the gyro so as to decrease the inclination of the spin axis so that the spin axis of the gyro rotor 2 is finally made coincident with the vertical line. Thus, the erector 3 performs its functions. However, the prior art erector 3 has the following shortcomings.

(1) In order to decelerate the rotation of the gyro rotor 2 that is rotated at high speed at about 10000 r.p.m. to a rotation low speed of about 1 to 20 r.p.m. and also to make its low speed rotation constant, the prior art erector 3 requires a plurality of special and expensive parts such as a torque transmission mechanism formed by the magnet 3-1 and the annular ring 3-6, the decelerating mechanism formed of the sun gear 3-2 and the planet gear 3-8, the speed governor mechanism formed of the ratchet gear 3-9 and the ratchet member 3-10. Further, it takes a long time for such parts to be assembled and to be adjusted.

(2) Since insufficient lubrication of the decelerating mechanism, the speed governor mechanism and so on obstructs smooth rotation of the rotation portion 3-5 and deprives the function of the erector, the maintenance and the inspection at predetermined times are necessary.

(3) Since the rotation of the gyro rotor 2 is led to the outside of the gyro casing 1, it becomes impossible to make the inside of the gyro casing 1 have a tightly-closed state so that dust and so on inevitably enter into the gyro casing 1, thus the life of the spin axis bearing are made short.

(4) Since the ball 3-15 which is heavy is rotated, the periodical torque acts so that even in the state in which the spin axis of the gyro rotor 2 becomes coincident with the vertical line, the spin axis is never completely made still but continues to conically rotate with a small conical angle (precession). That is, this conical movement of the spin axis becomes the error of the gyroscopic horizon.

(5) Due to the rotation friction caused between the ball 3-15 and the groove portion 1-1, when the inclination angle $\theta$ of the gyro casing 1 is small, a dead zone is produced by the gravity acting on the ball 3-15 so that the correct erection torque can not be produced.

OBJECTS AND SUMMARY OF THE INVENTION

Accordingly, it is an object of this invention to provide an improved erector.

Another object of this invention is to provide an improved erector which utilizes the flow of liquid rather than the rotation of a ball unlike the prior art so that even when the inclination angle of a gyro casing is very small, excellent erection characteristic can be obtained without being affected by friction and the like.

A still another object of this invention is to provide an improved erector which uses a multipolar type motor having a low synchronizing revolution speed or a number and a speed reduction mechanism of simple construction for driving a rotation receptacle container at constant speed, so that as compared with a constant speed mechanism formed of a gyro rotor, a magnetic coupling and a ratchet system in the prior art example, the number of parts can be considerably reduced, no fluctuation of rotation is produced and a considerable decrease in cost can be made.

A yet another object of this invention is to provide an improved erector in which a gyro casing requires no extended shaft for the erector and can be formed as an air-tight structure so that no dust enter the gyro casing and long life of the rotor bearing is obtained.

A further object of this invention is to provide an improved erector in which the rotation of a rotation receptacle container is separated from the rotation of the gyro rotor, so that as the erector, a motor, a base plate, a rotation receptacle container and the like can be formed integrally as a unit, assembled independently by separate processes and attached to the gyro casing after the inspection, thus assembling, inspection, or maintenance, inspection service and so on being made very simple.

According to one aspect of this invention, there is provided an erector for holding a spin axis of a gyro rotor in the vertical direction used in a gyroscopic horizon which comprises a gyro casing incorporating therein a gyro rotor rotating at high speed, a spin axis of said gyro rotor being held substantially in the vertical direction, first supporting means for rotatably supporting said gyro casing around a first horizontal axis which is perpendicular to said spin axis and second supporting means for rotatably supporting said first supporting means around a second horizontal axis which is perpendicular to both said spin axis and said first horizontal axis, said erector comprising:

(a) a base plate,
(b) a motor mounted on said base plate;
(c) a rotation receptacle container having an annular shape cavity and rotated at low speed by said motor; and
(d) liquid charged into said annular shape cavity of said rotation receptacle container, said base plate being mounted on said gyro casing such that a rotation axis of said rotation receptacle container and said spin axis of said gyro rotor become parallel to each other.

The other objects, features and advantages of the present invention will become apparent from the following description taken in conjunction with the accompanying drawings through which the like references designate the same elements and parts.

DESCRIPTION OF THE PREFERRED EMBODIMENTS

Now, the present invention will hereinafter be described in detail with reference to the drawings.

Figure 1:
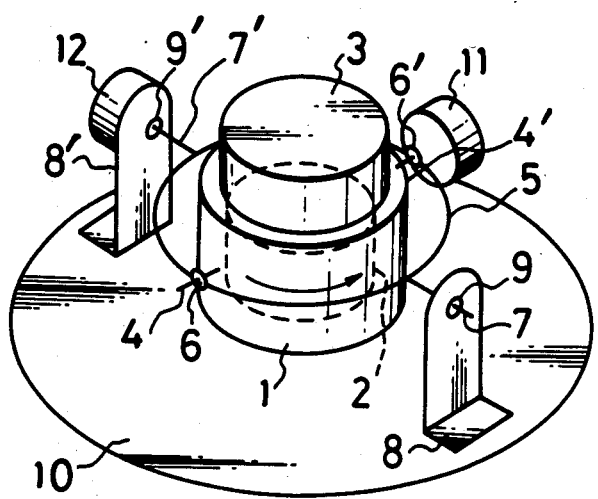
FIG. 1 is a perspective view illustrating an example of a prior art gyroscopic horizon to which the present invention is applied.
Figure 4:
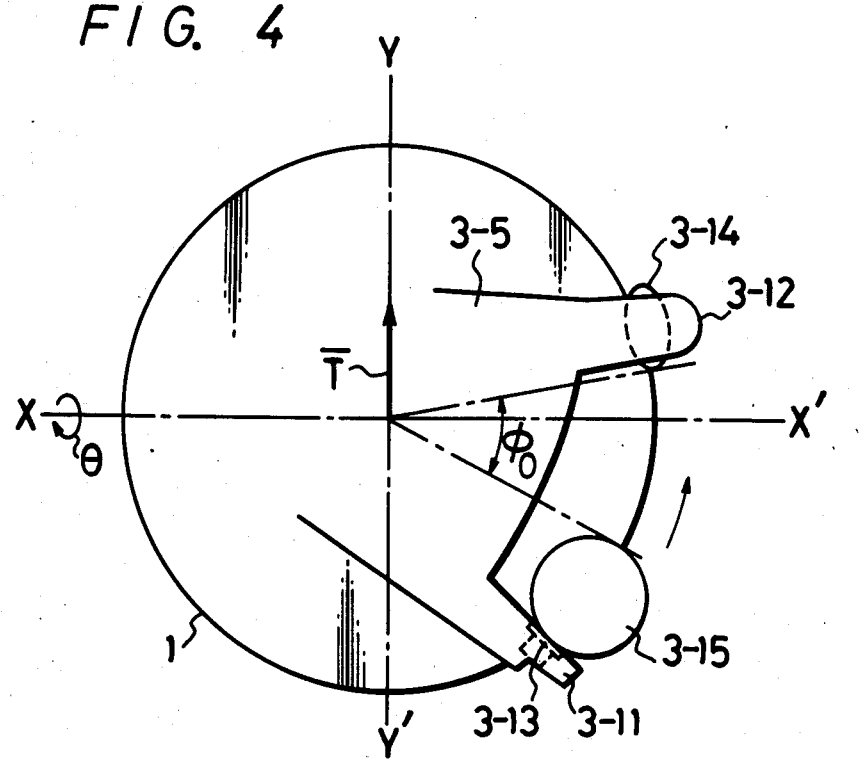
FIG. 4 is a schematic view useful for explaining the operation of the main part of FIG. 2.
Figure 2:
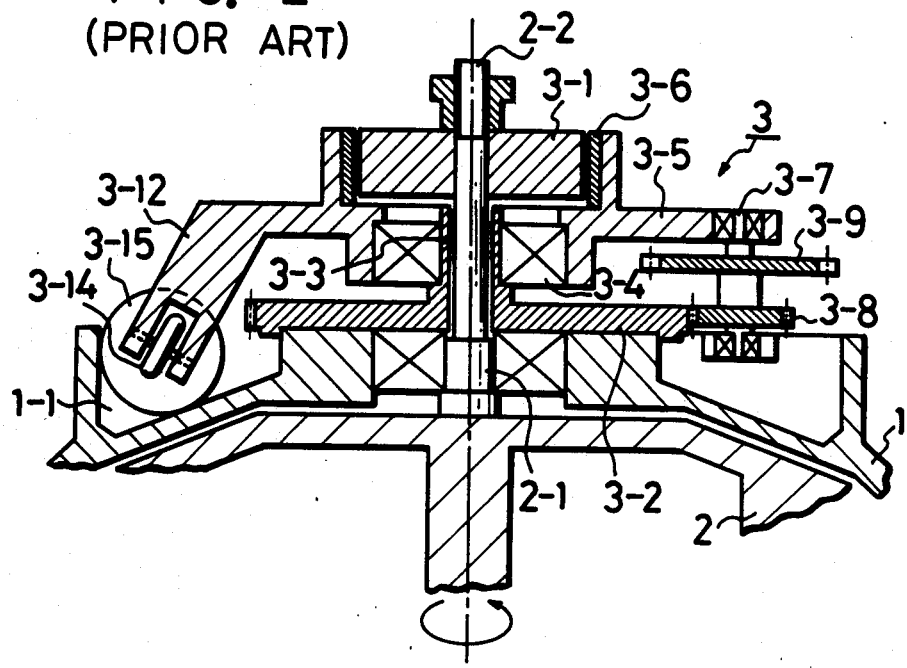
FIG. 2 is an enlarged cross-sectional view of a prior art erector which is used in the prior art gyroscopic horizon shown in FIG. 1.
Figure 3:
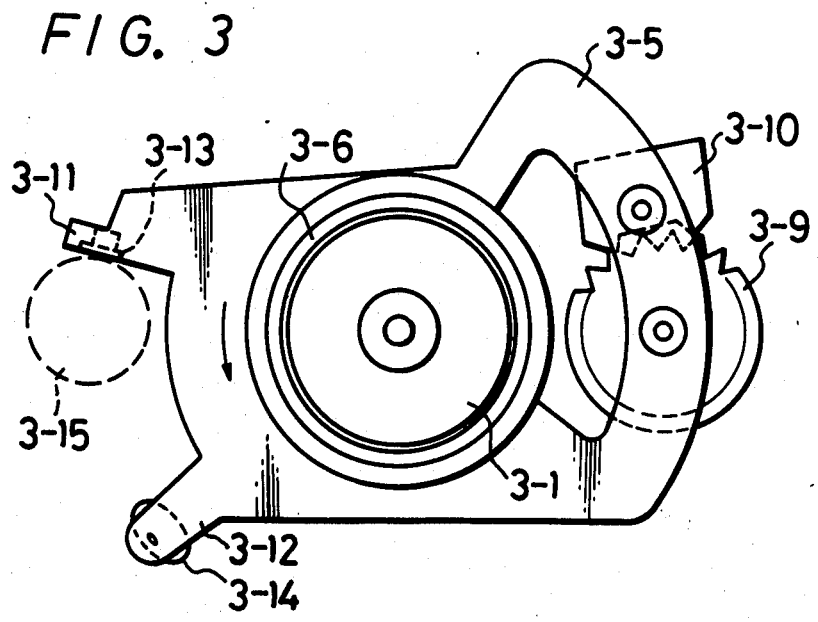
FIG. 3 is a top view of a main part of FIG. 2.
Figure 5:
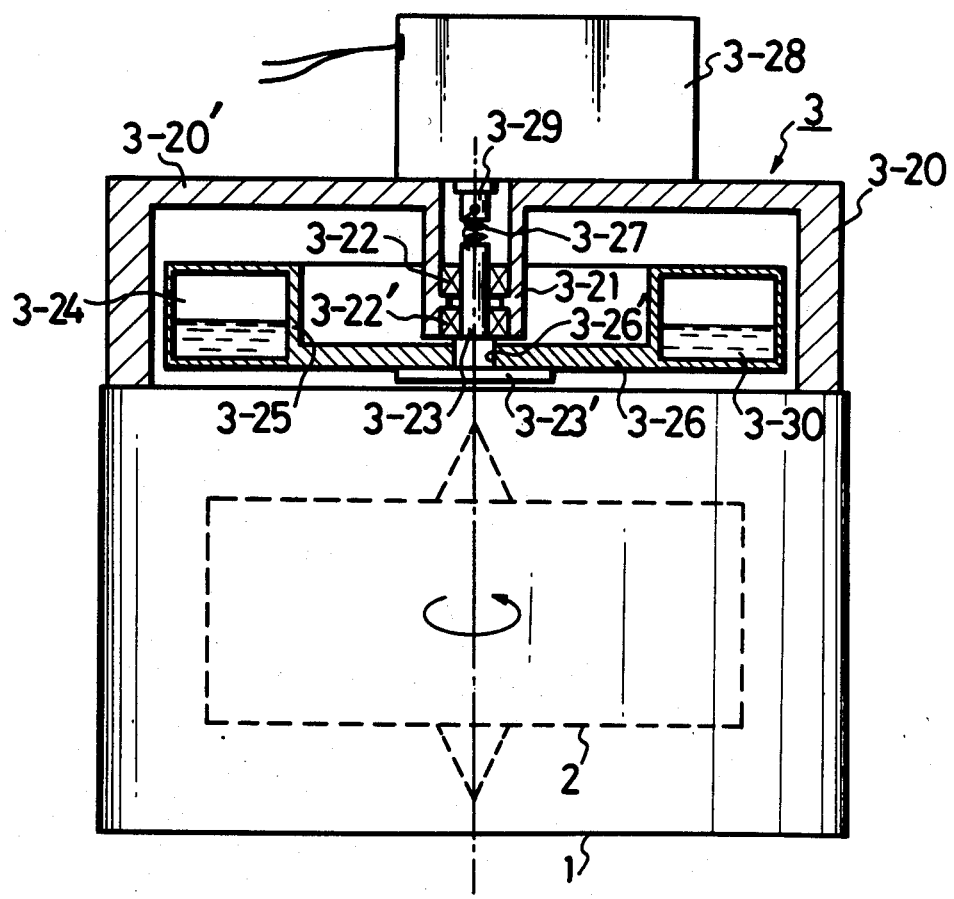
FIG. 5 is a cross-sectional view showing a first embodiment of an erector according to the present invention.

FIG. 5 is a cross-sectional view illustrating a first embodiment of an erector 3 according to this invention which is used for the gyroscopic horizon. In this embodiment, as shown in FIG. 5, a base plate 3-20 of U-shape cross section is mounted on the upper portion of the gyro casing 1 such that its coupling portion 3-20' is placed upwards. The base plate 3-20 is provided at its central portion with a cylindrical bearing support portion 3-21 which is protruded downwardly from the coupling portion 3-20' and engageably supports therein outer rings of, for example, two ball bearings 3-22 and 3-22' which are separated from each other in the vertical direction. The ball bearings 3-22 and 3-22' are engaged at their inner rings with a shaft 3-23 which includes a flange 3-23' at the lower portion thereof. The shaft 3-23 is engaged with a central opening 3-26' of a disc-shape portion 3-26 of a rotation receptacle container 3-25 having an annular cavity portion 3-24 at its outer periphery which disc-shaped portion contacts with the flange 3-23'.

While, the upper end portion of the shaft 3-23 is coupled through a coupling 3-27 (a coil spring is used in the figure) to a drive shaft 3-29 of a motor 3-28 which incorporates therein a speed reduction mechanism (not shown) so as to rotate the rotation receptacle container 3-25 at low speed independently from the gyro rotor 2. Filled into the cavity portion 3-24 of the rotation receptacle container 3-25 is a liquid 3-30 of high viscosity such as silicone oil and the like so as to occupy about the half of the cavity portion 3-24.

While the motor 3-28 may be in principle any type so long as a substantially constant revolution number can be maintained, it is desired that the motor 3-28 may be a low-speed type having a large number of poles which appears on the market under the product name of a timing motor and the like.

Figure 6A:
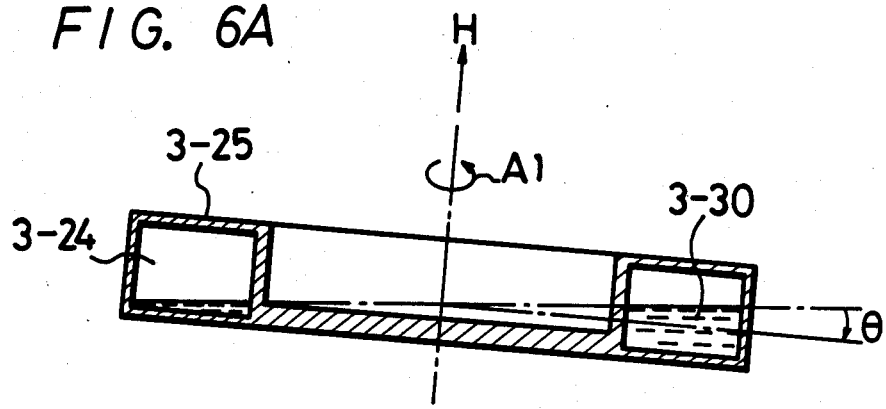
FIGS. 6A and 6B are respectively schematic views used to explain the operation principle of the first embodiment of the erector according to this invention shown in FIG. 5.
Figure 6B:
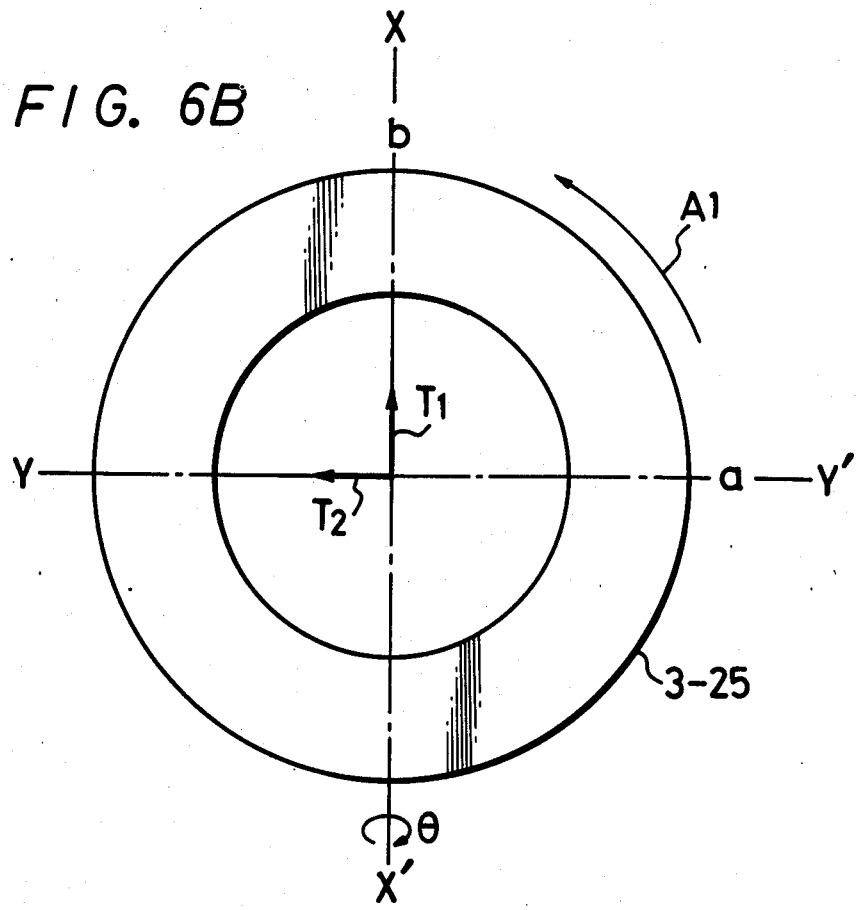

The theory or principle of the erector 3 of this invention will be described with reference to FIGS. 6A and 6B. FIG. 6A is a side cross-sectional view of the erector 3 in which the spin axis of the gyro rotor 2, namely, the rotation receptacle container 3-25 is inclined by an angle $\theta$ around an X-X' axis, while FIG. 6B is a plan view thereof under the above state. In FIG. 6A, reference letter H represents an angular momentum of the gyro.

When the rotation receptacle container 3-25 is not rotated, the surface of the operating liquid 3-30 becomes horizontal so that a portion of the container 3-25 at the side shown by letter a in FIG. 6B becomes heavy and a torque shown by reference letter T1 in the figure is generated. However, this torque T1 only causes the precession movement in the gyro in the direction perpendicular to the inclined angle $\theta$ but does not produce any erecting torque for the gyro.

On the other hand, when the rotation receptacle container 3-25 is rotated in the direction shown by an arrow A1 by the motor 3-28, due to the viscous resistance between the bottom and side surfaces of the annular cavity portion 3-24 of the rotation receptacle container 3-25 and the liquid 3-30, the liquid at the point a is raised up and the deepest liquid surface is moved to the advanced side shown by letter b from the most inclined portion a of the rotation receptacle container 3-25. Accordingly, the liquid thus moved causes a torque shown by reference letter T2 in FIG. 6B to be generated. This torque T2 acts on the angular momentum H of the gyro, which is the vector oriented in the upper direction, to generate the precession in the gyro in the direction to decrease the inclined angle $\theta$ of the spin axis. Thus, this erector functions for the gyro.

Figure 7:
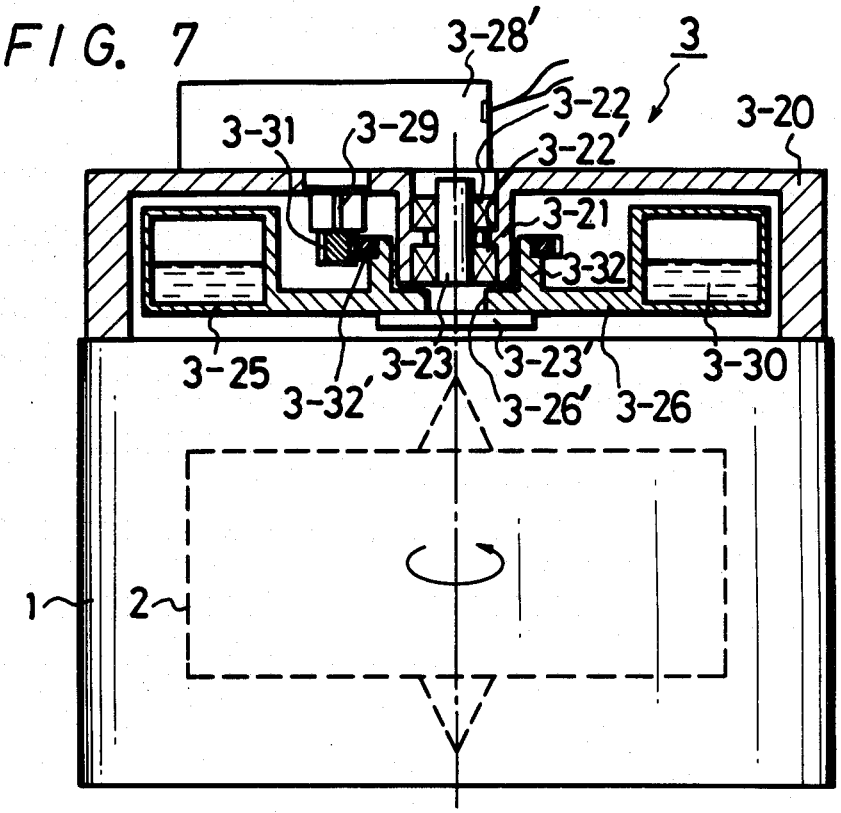
FIG. 7 is a cross-sectional view illustrating a second embodiment of the erector according to this invention.

FIG. 7 is a cross-sectional view showing a second embodiment of the erector 3 according to this invention. In this embodiment, a motor 3-28' includes no speed reduction mechanism but instead a small gear 3-31 is attached to an end of the shaft 3-29 of the motor 3-28', and formed on the disc-shape portion 3-26 of the rotation receptacle container 3-25 is a boss portion 3-32 to which a large gear 3-32' that is meshed with the small gear 3-31 is attached. Since the other members and arrangements are substantially similar to those in FIG. 5, they are marked with the same references as those in FIG. 5 and hence will not be described.

In accordance with the second embodiment of the invention, the same action and effects as those in the first embodiment shown in FIG. 5 can be achieved and hence they will not be described.

Figure 8:
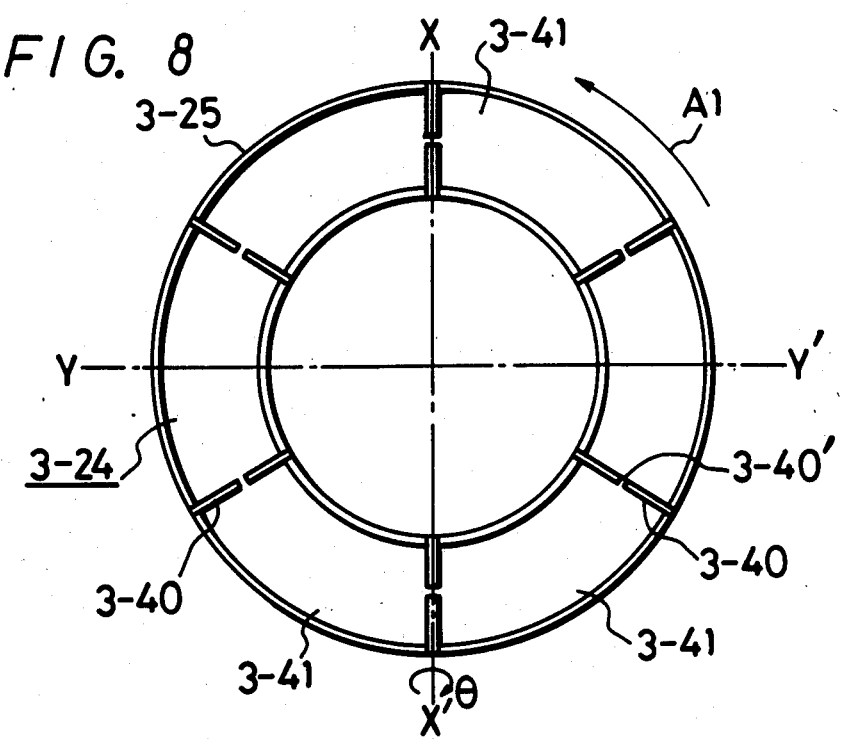
FIG. 8 a top view showing a third embodiment of the erector according to the present invention.

FIG. 8 is a top view illustrating a main part of a third embodiment of the erector 3 according to this invention. The erector of this third embodiment is suitable for a case in which a liquid of low viscosity such as mercury and the like is used as the operating liquid 3-30. In this embodiment, as shown in FIG. 8, the annular cavity portion 3-24 of the rotation receptacle container 3-25 is divided into a plurality of rooms or separated by, for example, six compartment plates 3-40 to form six rooms 3-41 of the equal shape. In this case, each compartment plate 3-40 is provided at its lower portion with an aperture 3-40' through which the liquid 3-30 of low viscosity which is filled into the cavity portion 3-24 of the rotation receptacle container 3-25 is flowed between the adjacent rooms 3-41 with a predetermined time constant.

Instead of the aperture 3-40', a narrow slit may be used. In short, the shape of the aperture 3-40' may be one such that the liquid 3-30 of low viscosity can flow between the adjacent rooms 3-41 with the above predetermined time constant. The erector of this third embodiment can act similarly to those of the preceding embodiments and become an excellent erector for the gyro.

The number of the compartment plates 3-40, namely, the rooms 3-41 is not limited to 6, but may be more than 3.

The features, advantages and effects of the erector for a gyroscopic horizon according to this invention can be summarized as follows:

(1) Since the erector utilizes the flow of the liquid and not the rotation of a ball unlike the prior art, even when the inclination angle of a gyro casing is very small, excellent erection characteristic can be obtained without being affected by the friction and the like.

(2) In the erector of the invention, since the multipolar type motor having a low synchronizing revolution number and a speed reduction mechanism of simple construction are employed for driving the rotation receptacle container at constant speed, as compared with the constant speed mechanism formed of the gyro rotor, the magnetic coupling and the ratchet system in the prior art example, the number of parts can be considerably reduced, no flunctions in the rotation are produced and a considerable decrease in cost can be obtained.

(3) Since the gyro casing requires no extended shaft for the erector and can be formed as an air-tight structure, no dust enter the gyro casing and the long life of the rotor bearing can be obtained.

(4) Since the multipolar-type motor, the speed reduction mechanism and so on are now on the market at low cost, the assembly part used in this invention can be easily obtained at low cost and hence the erector of this invention can be made inexpensively.

(5) Since in this invention the rotation of the rotation receptacle container is separated from the rotation of the gyro rotor, as the erector, the motor, base plate, rotation receptacle container and the like can be formed integral as a unit and assembled independently by separate processes and then attached to the gyro casing after the inspection thereof, thus assembling, inspection, or maintenance, inspection service and so on are very simple.

(6) The torque generated by the speed reduction mechanism, the ratchet and the like do not provide any load for the motor which drives the gyro rotor unlike the prior art, so that the generation of heat at the gyro motor side can be maintained low and hence the life of the spin axis bearing can be made to be long.

(7) Since the container shown in FIG. 5 is an annular receptacle and hence is simple in construction and can be manufactured easily, the erector of this embodiment can be produced at low cost.

(8) In this invention, the liquid which is low in density and high in viscosity such as silicone oil and the like is used as the operating liquid which is but liquid high in density such as mercury is not used so that the operating liquid has no resonance point in the container unlike mercury and, the swing error will be small.

(9) Since there is no need to use a poisonous liquid like mercury, it is possible to avoid a bad effects due to the leakage of the poisonous liquid and which results in danger to the human body.

Figure 9:
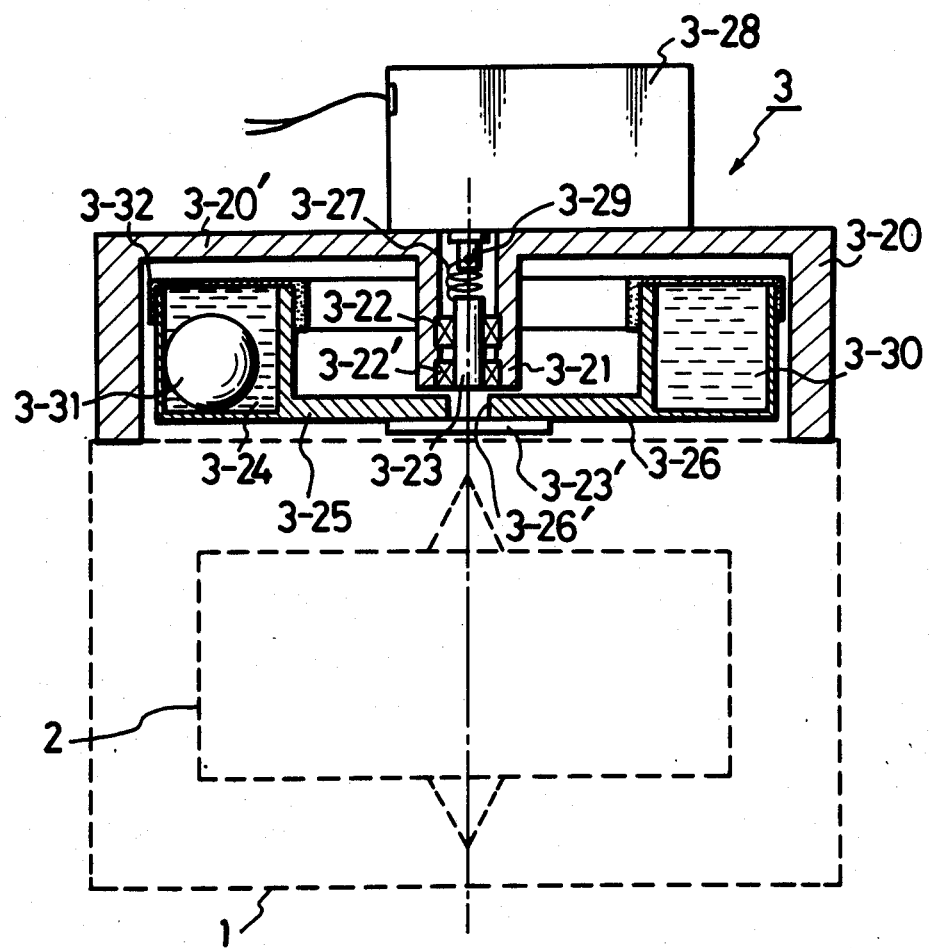
FIG. 9. is a cross-sectional view illustrating a fourth embodiment of the erector according to the present invention.

FIG. 9 is a cross-sectional view showing a fourth embodiment of the erector 3 according to this invention. In FIG. 9, like parts corresponding to those in the preceding embodiments are marked with the same references and will not be described in detail.

In this fourth embodiment, as shown in FIG. 9, similarly to the first embodiment shown in FIG. 5, the base plate 3-20 of U-shape cross section is mounted on the upper portion of the gyro casing 1 such that its coupling portion 3-20' is located above. The base plate 3-20 is provided at its central portion with the cylindrical bearing support portion 3-21 which is provided downwardly from the coupling portion 3-20' and engageably holds therein the outer rings of, for example, the two ball bearings 3-22 and 3-22' which are separated from each other in the vertical direction. The ball bearings 3-22 and 3-22' are engaged at their inner rings with the shaft 3-23 which includes the flange 3-23' at the lower portion thereof. The shaft 3-23 is engaged with the central opening 3-26' of the disc-shape portion 3-26 of the rotation receptacle container 3-25 having the annular cavity portion 3-24 in its outer periphery which disc-shaped portion contacts with the flange 3-23'.

The upper end portion of the shaft 3-23 is coupled through the coupling 3-27 (the coil spring is used in this example) to the drive shaft 3-29 of the motor 3-28 which incorporates therein the speed reduction mechanism which is not shown. Accordingly, independently from the gyro rotor 2, the rotation receptacle container 3-25 can be rotated at low speed by the motor 3-28. Filled into the cavity portion 3-24 of the rotation receptacle container 3-25 is a damping liquid 3-30 of high viscosity such as silicone oil and the like and incorporates therein a ball 3-31 which is movable. Reference numeral 3-32 designates a cover which is made of a flexible material. This cover 3-32 serves to prevent the damping liquid 3-30 from leaking out of the cavity portion 3-24 and the upper film-like portion of the cover 3-32 serves to compensate for changes of the volume of damping liquid 3-30 caused by heat expansion.

While the motor 3-28 may be in principle any type so long as a substantially constant revolution can be maintained, it is desired that the motor 3-28 be a low speed-multipolar type having a large number of poles which appears on the market under the product name of a timing motor and the like.

Figure 10A:
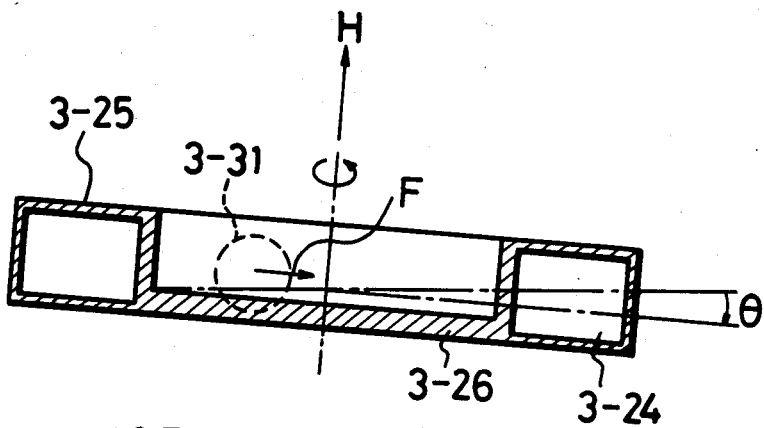
FIGS. 10A and 10B are respectively schematic views useful for explaining the operation of the fourth embodiment of this invention shown in FIG. 9.
Figure 10B:
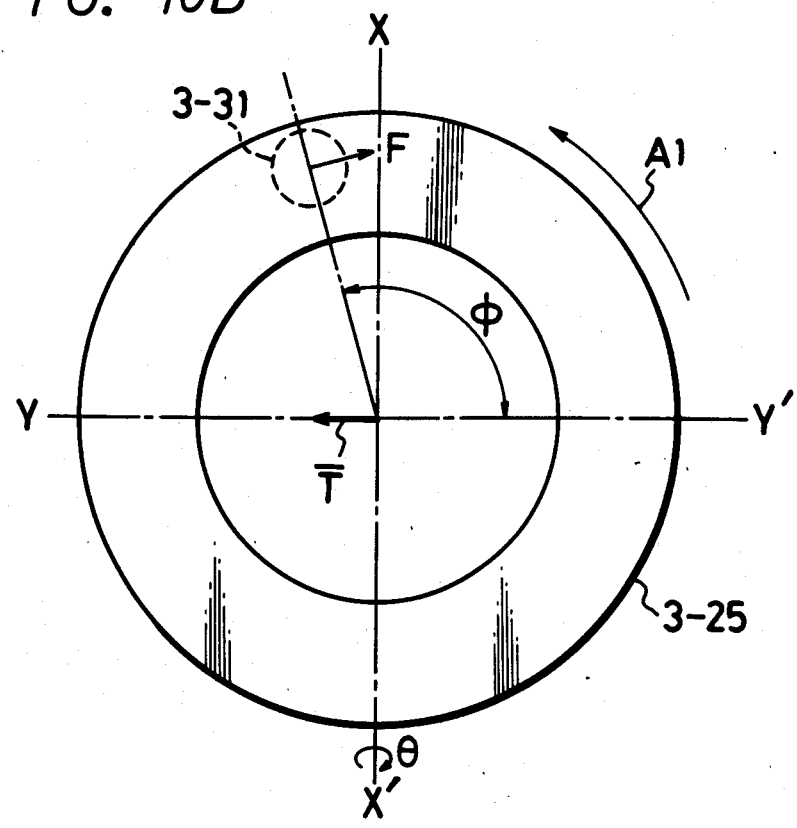

FIGS. 10A and 10B are respectively schematic views useful for explaining the principle of the fourth embodiment of the erector according to this invention shown in FIG. 9.

FIG. 10A is a side cross-sectional view of the container 3-25 when the spin axis of the gyro rotor 2, namely, the rotation receptacle container 3-25 is inclined by an angle $\theta$ around X–X' axis, while FIG. 10B is a plan view thereof. In FIG. 10A, reference letter H represents an angular momentum of the gyro.

When the inclination angle $\theta$ is zero, namely, the gyro spin axis is vertical, the ball 3-31 is rotated together with the rotation receptacle container 3-25 due to the viscosity of the damping liquid 3-30 so that no torque acts on the gyro casing 1 during an average rotation. On the other hand, when the rotation receptacle container 3-25 is inclined around the X–X' axis as shown in FIG. 10A, fundamentally, the rotation receptacle container 3-25 is rotated substantially together with the ball 3-31 similarly as above. In this case, however, when the ball 3-31 is rotated through the upper half portion of FIG. 10B in the direction shown by an arrow A1, the bottom surface of the rotation receptacle container 3-25 is raised so that the vector component of force F due to the gravity is in substantially the right-hand side direction, namely, acts to delay the rotational movement of the ball 3-31. While, when the ball 3-31 is rotated through the lower half portion of FIG. 10B, the bottom surface of the rotation receptacle container 3-25 descends so that the component of force F accelerates the rotation movement of the ball 3-31. In other words, due to the inclination angle $\theta$, the rotation speed of the ball 3-31 is slow on the upper side of the Y–Y' axis, while it is high on the lower side of the Y–Y' axis so that in view of the integration average of one period, the ball 3-31 exists during a long duration of a period on the upper side of the axis Y–Y' as compared with a case in which it exists on the lower side of the Y–Y' axis. As a result, a torque shown by $\overline{T}$ in FIG. 10B is produced in response to the inclination angle $\theta$. Thus, this torque $\overline{T}$ acts on the angular momentum H of the gyro and causes precession of the gyro to thereby decrease the inclination angle $\theta$, thus functioning as an erector. The same action and effect as those of the preceding embodiments are positively achieved by this fourth embodiment and hence they will not be described.

Figure 11:
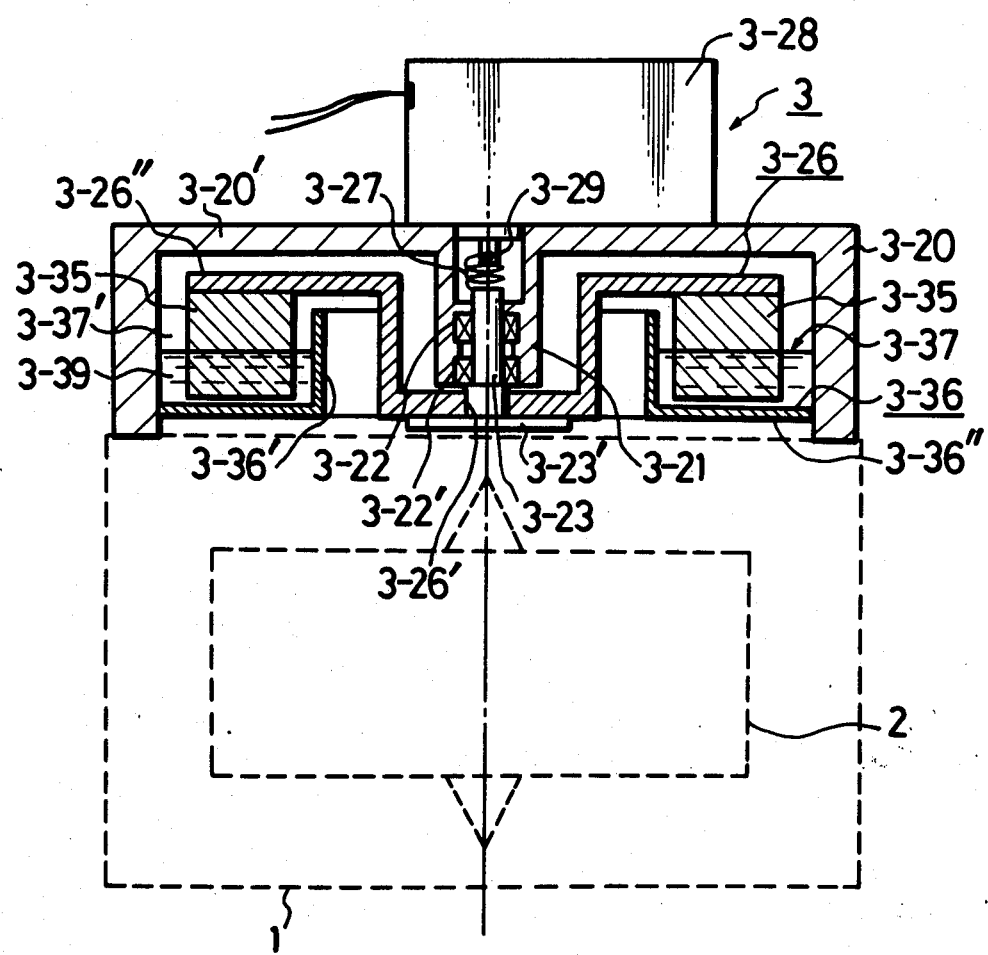
FIG. 11 is a cross-sectional view illustrating a fifth embodiment of the erector according to this invention.

FIG. 11 is a cross-sectional view illustrating a fifth embodiment of the erector 3 according to the present invention. In FIG. 11, like parts corresponding to those of the preceding embodiments are marked with the same references and will not be described in detail.

In this embodiment, as shown in FIG. 11, a base plate 3-20 of cylindrical-shape is mounted on the upper portion of the gyro casing 1 such that its upper lid 3-20' is located at the upper side. The base plate 3-20 is provided at its central portion with the cylindrical bearing support portion 3-21 which is protruded downwardly from the upper lid 3-20' and engageably supports therein the outer rings of, for example, the two bearings 3-22, 3-22' which are separated from each other in the vertical direction. The shaft 3-23 having at its lower portion the flange 3-23' engages with the inner rings of the ball bearings 3-22 and 3-22'. On the flange 3-23', the shaft 3-23 engages the central opening 3-26' formed through the bottom of the ash tray-shaped support member 3-26" so that the support member 3-26 is rotated together with the shaft 3-23. To an upper flange 3-26" of the support member 3-26, a large number of stirring plates or fins 3-35 are downwardly fixed along its circumferential direction. The relationship between the support member 3-26 and the stirring plates 3-35 is made clear from FIG. 12B which show a state in which the erector 3 in FIG. 11 is seen from above and which is used to explain the principle of this invention.

The upper end of the shaft 3-23 is connected through the coupling 3-27 (which is the same as the coil spring which is used in the embodiment shown in FIG. 11) to the drive shaft 3-29 of the motor 3-28 which incorporates therein a speed reduction mechanism (not shown).

Fixed to the inside of the base plate 3-20 is a receptacle container forming member 3-36 consisting of an annular inner wall 3-36' in the vertical direction and an annular plate 3-36" in the horizontal direction which forms the bottom of the receptacle container. Accordingly, the base plate 3-20 and the member 3-36 constitute a circular and annular receptacle container 3-37 as shown in FIG. 11 and the operating liquid 3-39 is filled into an inner space 3-37' of the receptacle container 3-37 so as to occupy substantially one half thereof. Each stirring plate 3-35 is partially immersed into the liquid 3-39. Accordingly, when the support member 3-26 is rotated, the stirring plate 3-35 is rotated while being immersed into the liquid 3-39 within the annular receptacle container 3-37 while not in contact with the base plate 3-20 and the member 3-36.

Figure 12A:
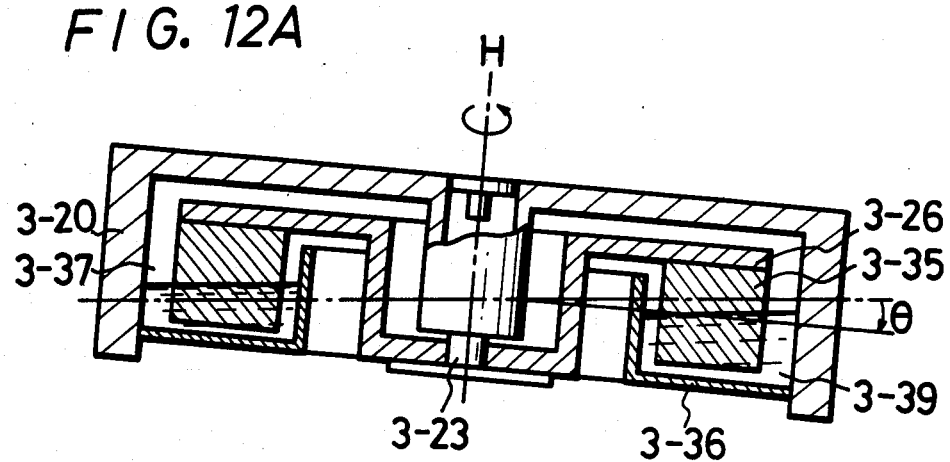
FIGS. 12A and 12B are respectively schematic views useful for explaining the operation of the fifth embodiment of the present invention shown in FIG. 11.
Figure 12B:
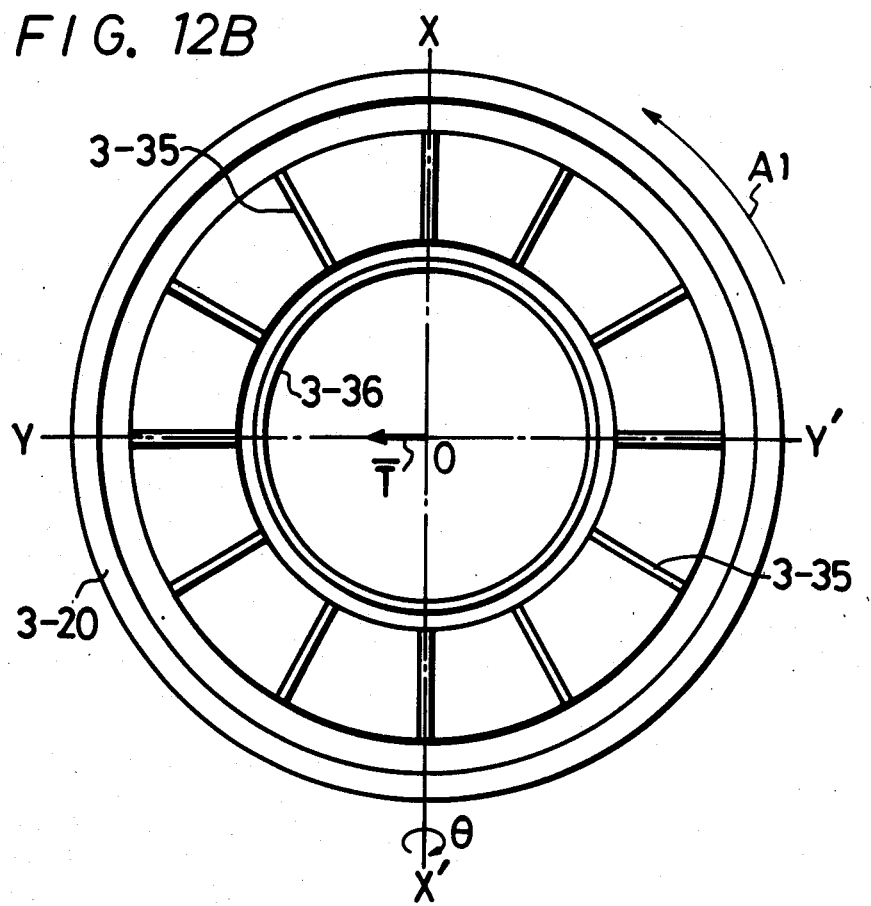

FIGS. 12A and 12B are respectively schematic views useful for explaining the principle of this embodiment of the erector 3 according to the present invention. FIG. 12A is a side cross-sectional view useful for explaining the principle of this example of the invention and which shows a case in which the main part of the erector 3 in FIG. 11, namely, the base plate 3-20, the receptacle container forming member 3-36, the support member 3-26 and the stirring plate 3-35 are integrally inclined. This inclination is represented as an angle $\theta$ around the X-X' axis. This inclination corresponds to a case in which the spin axis of the gyro rotor 2 is inclined by the angle $\theta$ around the X-X' axis relative to the vertical line.

FIG. 12B shows such erector in FIG. 12A as viewed from above. Without the stirring plate 3-35, the surface or level of the liquid 3-39 tends to become horizontal so that the depth of the liquid 3-39 in the 0-Y' direction becomes deepest and the gravity torque thereby is generated around the X-X' axis. Since this torque generates the precession of the spin axis around the Y-Y' axis, this torque does not become an erecting torque. However, in the erector of this invention, since the stirring plate 3-35 is rotated in the direction shown by the arrow A1 in FIG. 12B, the liquid 3-39 is raised in level from the 0-Y' direction to the 0-X direction by the stirring plate 3-35. Further, the liquid 3-39 thus raised up is passed through the spacing formed between the annular and circular receptacle container 3-37 and the stirring plate 3-35 and returned little by little in the 0-Y' direction by gravity. This phenomenon occurs in the so-called ascending slope. While, in the lower side of the Y-Y' axis in FIG. 12B, namely, in the descending slope, since the direction along which the liquid moving through the spacing is coincident with the direction in which the stirring plate 3-35 stirs the liquid 3-39, the level of the liquid 3-39 is lowered as compared with a case in which no stirring plate 3-35 is provided. As a result, the portion in which the amount of the liquid 3-39 is largest is moved from the 0-Y' direction to the 0-X direction. In response thereto, the gravity torque $\overline{T}$ around the Y-Y' axis is produced. If the rotation speed of the stirring plate 3-35 is constant, the torque $\overline{T}$ is proportional to the angle $\theta$. Hence, this torque $\overline{T}$ causes the spin axis to move in a precession fashion around the X-X' axis so as to decrease the angle $\theta$. In other words, the present embodiment functions as an erector.

In the above embodiment the spin of the gyro rotor 2 is oriented in a direction (which is the direction that a right hand screw turns). If the spin of the gyro rotor 2 is oriented in the opposite direction, the support member 3-26 and the stirring plate 3-35 are rotated in the opposite direction to that shown by the arrow A1 in FIG. 12B.

As the annular receptacle container 3-37, without utilizing the inner wall of the base plate 3-20, a similar receptacle is independently formed and this receptacle is fixed to the inner wall of the base plate 3-20.

As will be clear from the above description, the same action and effect as those in the above embodiments are achieved by this fifth embodiment of the invention and hence they will not be described.

The above description is given on the preferred embodiments of the invention, but it will be apparent that many modifications and variations could be effected by those skilled in the art without departing from the spirits or scope of the novel concepts of the invention, so that the scope of the invention should be determined by the appended claims only.

We claim as our invention:

1. An erector for holding a spin axis of a gyro rotor in the vertical direction used in a gyroscopic horizon which comprises a gyro casing incorporating therein a gyro rotor rotating at high speed, a spin axis of said gyro rotor being held substantially in the vertical direction, first supporting means for rotatably supporting said gyro casing around a first horizontal axis which is perpendicular to said spin axis and a second supporting means for rotatably supporting said first supporting means around a second horizontal axis which is perpendicular to both said spin axis and said first horizontal axis, said erector comprising:

(a) a base plate,
(b) a motor mounted on said base plate, (c) a rotation receptable having an annular shaped cavity and rotated at low speed by said motor;
(d) a liquid in said annular shaped cavity of said rotation receptacle,
said base plate being mounted on said gyro casing such that the rotation axis of said rotation receptacle and said spin axis of said gyro rotor become substantially coincident to each other; and
(e) a ball immersed in said liquid.

2. An erector as claimed in claim 1, in which said rotation receptacle is rotated by said motor through a speed reduction mechanism.

3. An erector as claimed in claim 2, in which said speed reduction mechanism is coupled to said rotation receptacle with a coil spring.

4. An erector as claimed in claim 2, in which said speed reduction mechanism includes a plurality of gears.

* * * * *